US012677104B2

(12) United States Patent
Landemaine

(10) Patent No.: US 12,677,104 B2
(45) Date of Patent: Jul. 7, 2026

(54) AUTOMATIC SENSOR ORIENTATION CALIBRATION

(71) Applicant: Bose Corporation, Framingham, MA (US)

(72) Inventor: Thomas Landemaine, Cambridge, MA (US)

(73) Assignee: Bose Corporation, Framingham, MA (US)

(*) Notice: Subject to any disclaimer, the term of this patent is extended or adjusted under 35 U.S.C. 154(b) by 138 days.

(21) Appl. No.: 18/649,511

(22) Filed: Apr. 29, 2024

(65) Prior Publication Data

US 2025/0338073 A1 Oct. 30, 2025

(51) Int. Cl.

*H04R 29/00* (2006.01)
*H04R 1/10* (2006.01)
*H04R 1/32* (2006.01)

(52) U.S. Cl.

CPC ......... *H04R 29/001* (2013.01); *H04R 1/1091* (2013.01); *H04R 1/323* (2013.01)

(58) Field of Classification Search

CPC ..... H04R 1/1091; H04R 1/323; H04R 29/001
See application file for complete search history.

(56) References Cited

U.S. PATENT DOCUMENTS

| | | | | |
|---|---|---|---|---|
| 10,880,670 | B2 * | 12/2020 | Hammerschmidt | H04S 7/304 |
| 2012/0002822 | A1 * | 1/2012 | Peissig | H04R 1/1041 381/74 |
| 2013/0259244 | A1 * | 10/2013 | Christensen | H04S 7/304 381/58 |
| 2014/0058662 | A1 | 2/2014 | Tachibana et al. | |
| 2015/0326963 | A1 * | 11/2015 | Sørensen | H04R 3/12 381/74 |
| 2018/0157332 | A1 | 6/2018 | Nie | |
| 2021/0149479 | A1 | 5/2021 | Huang et al. | |
| 2024/0361848 | A1 * | 10/2024 | Pedersen | H04R 25/552 |

OTHER PUBLICATIONS

Notification of Transmittal of the International Search Report and the Written Opinion of the International Searching Authority, or the Declaration, PCT Application No. PCT/US2025/026152, dated Jul. 11, 2025, pp. 1-13.

* cited by examiner

*Primary Examiner* — Paul W Huber
(74) *Attorney, Agent, or Firm* — Bond, Schoeneck & King, PLLC

(57) ABSTRACT

A wearable audio device is provided. The wearable audio device includes a sensor, such as an IMU and a controller. The sensor is configured to capture rotational motion data. At least a portion of the captured rotational motion data corresponds to head motion of a user. The sensor is further configured to generate a sensor orientation of the sensor based on the rotational motion data. The controller is configured to (1) receive the rotational motion data and the sensor orientation from the sensor; (2) generate, based on the rotational motion data, an orientation calibration parameter; and (3) map the sensor orientation to a head orientation of the user based on the orientation calibration parameter.

18 Claims, 9 Drawing Sheets

AUTOMATIC SENSOR ORIENTATION CALIBRATION

FIELD OF THE DISCLOSURE

The present disclosure is generally directed to automatic sensor orientation calibration, and more specifically to systems and methods for calibrating sensor orientation of wearable audio devices by analyzing natural head motion.

BACKGROUND

Wearable audio devices, such as earbuds, may include sensors for capturing rotational data. This rotational data may be used in a variety of applications, including spatialized audio. In the example of spatialized audio, the rotational data is used to approximate the position and the orientation of the head of the user, enabling the wearable audio device to render audio sounding as if the audio is being generated by an external source, rather than the wearable audio device. Spatialized audio may be particularly useful in virtual reality or augmented reality applications. Further, to correct for any orientation differences between the wearable audio device and the head of the user, the rotational data must be calibrated to map onto the orientation of the head of the user. In wearable audio devices with a limited range of wearing positions, calibration data to perform this mapping may be pre-programmed into a memory of the device. However, certain wearable audio devices may be worn in a wide range of positions, rendering pre-programming calibration data impractical. Further, other wearable devices may require affirmative steps to be taken by the user to perform the calibration, such as using an external device to photograph the position of the wearable audio device when worn. Many users will fail to perform these affirmative steps, resulting in degraded performance.

SUMMARY

The present disclosure is generally directed to systems and methods for automatic sensor orientation calibration. This automatic sensor orientation calibration is based on captured natural head motion of a user during operation of a wearable audio device, such as an earbud. Accordingly, the calibration may be performed during normal use without requiring user intervention. The wearable audio device generally includes a sensor and a controller. The sensor, such as an inertial measurement unit (IMU), is defined by a sensor orientation having a sensor x-axis, a sensor y-axis, and a sensor z-axis. While the wearable audio device is worn by the user, the sensor captures rotational motion data corresponding to head motion of the user. The sensor updates the sensor orientation according to the captured rotational motion data. The rotational motion data is also processed by the controller to generate an orientation calibration parameter. The controller then calibrates the sensor orientation based on the orientation calibration data, thereby mapping the sensor orientation to a head orientation of the user.

In some examples, the head motion of the user is primarily a yaw motion or a pitch motion. The yaw motion represents rotations about a z-axis of the head orientation of the user, while the pitch motion represents rotations about a y-axis of the head orientation of the user. Captured yaw motions and pitch motions may be used to generate the estimated head orientation data. Further, yaw motions and pitch motions tend to be "tight" motions, as they may be defined by a series of incremental rotations having rotation axes tightly clustered around a single axis. Accordingly, the rotational motion data may be processed to identify yaw motions and pitch motions based on these "tight" motions.

In some examples, the rotational motion data may include a series of angular velocity vectors captured during sequential event periods during a movement period. This series of angular velocity vectors may be processed to generate a series of rotation axes. The series of rotation axes may then be clustered together to determine a rotational dispersion for the entire series. If the rotational dispersion is within a dispersion threshold, the rotational motion data is considered to be representative of a "tight" motion, such as a yaw motion or pitch motion. The rotational motion data may then be used to determine the orientation calibration parameter to calibrate the sensor orientation. In some examples, the dispersion threshold may be less than or equal to 10 degrees. In further examples, the dispersion threshold may be determined by a neural network model trained on historic rotation data corresponding to the wearable audio device and/or other devices. In even further examples, the neural network model may be trained to identify "tight" motions directly from rotational motion data provided by the sensor.

Generally, in one aspect, a wearable audio device is provided. The wearable audio device includes a sensor. The sensor is configured to capture rotational motion data. At least a portion of the captured rotational motion data corresponds to head motion of a user. The sensor is further configured to generate a sensor orientation of the sensor based on the rotational motion data.

The wearable audio device further includes a controller configured to (1) receive the rotational motion data and the sensor orientation from the sensor; (2) generate, based on the rotational motion data, an orientation calibration parameter; and (3) map the sensor orientation to a head orientation of the user based on the orientation calibration parameter.

According to an example, the sensor is an IMU.

According to an example, the rotational motion data comprises angular velocity.

According to an example, the head motion includes a yaw motion.

According to an example, the head motion includes a pitch rotation.

According to an example, the controller is further configured to: (1) calculate, based on the rotational motion data, a series of rotation axes, wherein each of the series of rotation axes corresponds to one of a series of event periods during a movement period; (2) determine a rotational dispersion of the series of rotation axes; and (3) determine the orientation calibration parameter based on the rotational motion data if the rotational dispersion is within a dispersion threshold.

According to an example, the dispersion threshold is less than or equal to 10 degrees.

According to an example, the dispersion threshold is determined by a neural network model trained by historic rotation data.

According to an example, the movement period is less than one minute.

According to an example, the sensor orientation is defined by a sensor x-axis, a sensor y-axis, and a sensor z-axis.

According to an example, the wearable audio device is an earbud.

Generally, in another aspect, a method for automatically calibrating a sensor orientation of a sensor of a wearable audio device is provided. The method includes capturing, via the sensor, rotational motion data, wherein at least a portion of the captured rotational motion data corresponds to head motion of a user.

The method further includes generating, via the sensor, the sensor orientation of the sensor based on the rotational motion data.

The method further includes generating, based on the rotational motion data, an orientation calibration parameter.

The method further includes mapping the sensor orientation to a head orientation of the user based on the orientation calibration parameter.

According to an example, the sensor is an IMU.

According to an example, the rotational motion data includes angular velocity.

According to an example, the head motion includes a yaw motion.

According to an example, the head motion includes a pitch motion.

According to an example, calibrating the sensor orientation of the sensor further includes: (1) calculating, based on the rotational motion data, a series of rotation axes, wherein each of the series of rotation axes corresponds to one of a series of event periods during a movement period; (2) determining a rotational dispersion of the series of rotation axes; and (3) determining the orientation calibration parameter based on the rotational motion data if the rotational dispersion is within a dispersion threshold.

According to an example, the dispersion threshold is less than or equal to 10 degrees.

According to an example, the dispersion threshold is determined by a neural network model trained by historic rotation data.

According to an example, the sensor orientation is defined by a sensor x-axis, a sensor y-axis, and a sensor z-axis.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION

The present disclosure is generally directed to systems and methods for automatic sensor orientation calibration. This automatic sensor orientation calibration is based on captured natural head motion of a user during operation of a wearable audio device, such as an earbud. Accordingly, the calibration may be performed during normal use without requiring user intervention. The wearable audio device generally includes a sensor and a controller. The sensor, such as an inertial measurement unit (IMU), is defined by a sensor orientation having a sensor x-axis, a sensor y-axis, and a sensor z-axis. While the wearable audio device is worn by the user, the sensor captures rotational motion data corresponding to head motion of the user. The sensor updates the sensor orientation according to the captured rotational motion data. The rotational motion data is also processed by the controller to generate an orientation calibration parameter. The controller then calibrates the sensor orientation based on the orientation calibration data, thereby mapping the sensor orientation to a head orientation of the user.

Figure 1:
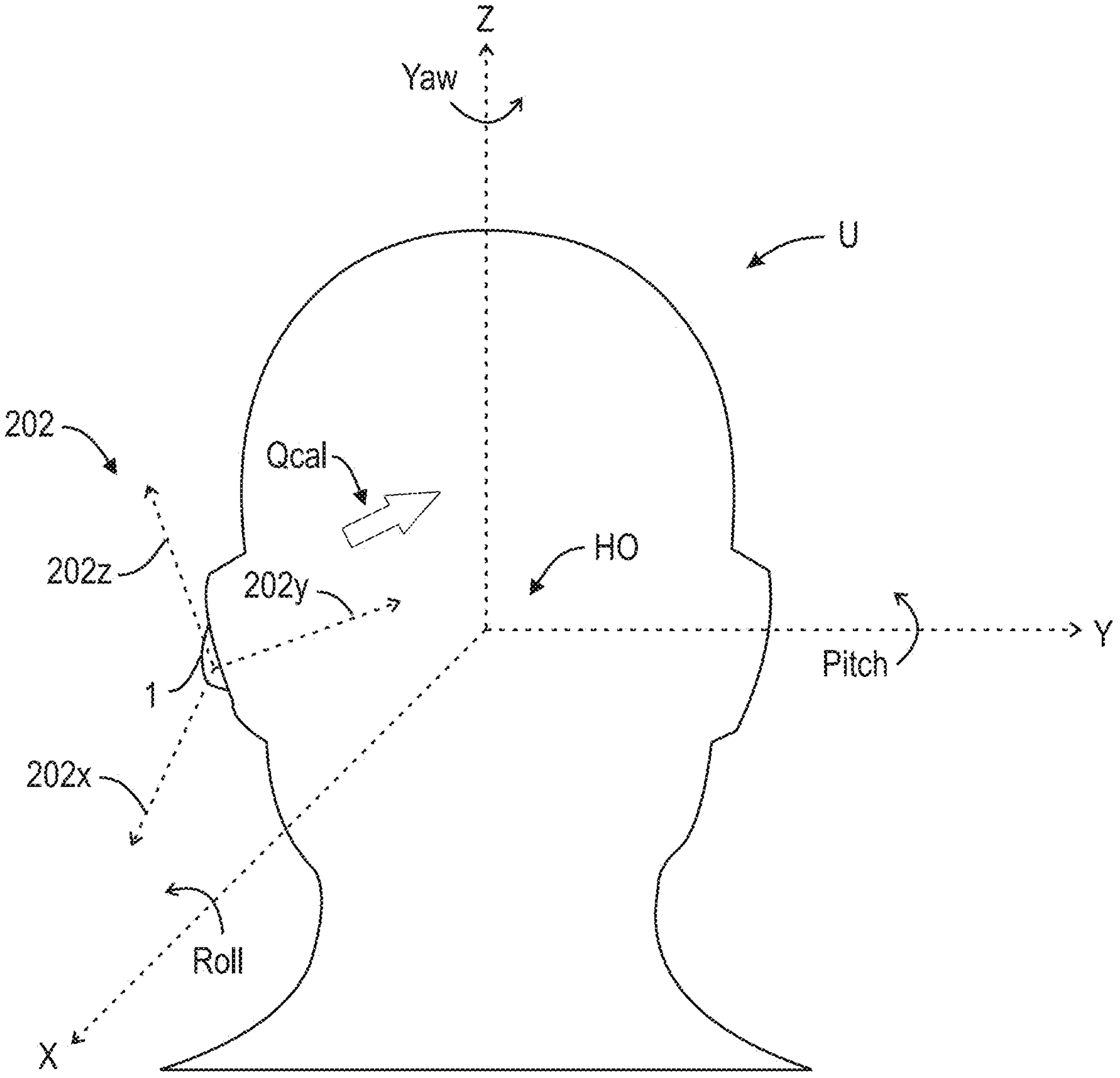
FIG. 1 is an illustration of a sensor orientation of a wearable audio device relative to a head orientation of a user, in accordance with an example.

The term "wearable audio device" as used in this disclosure, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds, or sport headphones, and can be wired or wireless. A wearable audio device includes an acoustic driver to transduce audio signals to acoustic energy. A wearable audio device can include components for wirelessly receiving audio signals. A wearable audio device can include components of an active noise reduction (ANR) system. Wearable audio devices can also include other functionality such as a microphone so that they can function as a headset. FIG. 1 shows an example of an in-the-ear form factor as a wireless earbud.

The following description should be read in view of FIGS. 1-10.

FIG. 1 is a non-limiting example of a wearable audio device 1 embodied as an earbud worn by user U. Rotational motion of a head of the user U may be defined in terms of a head orientation HO. The head orientation HO defines three axes about which the head of the user U may rotate. Movement about an x-axis is considered a roll motion. Movement about a y-axis is considered a pitch motion. Movement about a z-axis is considered a yaw motion. Many types of head movement may involve more than one type of motion. For example, some head movements could include both pitch motion and yaw motion components. Critically, pitch motions and yaw motions may be considered "natural" head motions, as users tend to frequently tilt (pitch motion) or rotate (yaw motion) their head. These natural head motions may occur subconsciously, without prompting from a third party. By identifying these natural head motions, captured data corresponding to these natural head motions may be used to calibrate aspects of the wearable audio device 1.

As will be demonstrated in subsequent figures, the wearable audio device 1 may include a controller 100, a sensor 200, a microphone 300, a speaker 400, and a transceiver 500. The controller 100 generally includes a memory 125 and a processor 175. The sensor 200 may be an IMU configured to capture rotational motion data 204 corresponding to movement about a sensor orientation 202. The IMU may include one or more accelerometers, gyroscopes, and/or magnetometers. As shown in FIG. 1, the sensor orientation 202 may be defined by a sensor x-axis 202*x*, a sensor y-axis 202*y*, and a sensor z-axis 202*z*. In other examples, the sensor 200 may be a different type of sensor configured to capture rotational motion data 204 corresponding to the movement of the head of the user U. The sensor 200 can use the rotational motion data 204 to calculate a sensor orientation 202 of the sensor 200. The rotation motion data 204 used to calculate the sensor orientation 202 must include signals and/or data provided by one or more gyroscopes of the sensor 200. Further, the rotation motion data 204 used to calculate the sensor orientation 202 typically also includes signals and/or data provided by one or more accelerometers of the sensor 200. This rotational motion data 204 may be used in a variety of applications, including spatialized audio. In the example of spatialized audio, the rotational motion data 204 is used to approximate the position, orientation, and rotational movement of the head of the user U, thereby enabling the speaker 400 of the wearable audio device 1 to render audio sounding as if the audio is being generated by an external source, rather the speaker 400 of the wearable audio device 1 worn by the user U.

As shown in FIG. 1, the sensor orientation 202 of the sensor 200 is tilted relative to the head orientation HO of the user U. Therefore, in some examples, the rotational motion data 204 captured by the sensor 200 may be skewed such that the spatialized audio generated by the speaker 400 may be inaccurately rendered. Accordingly, the sensor orientation 202 of the sensor 200 must be calibrated to provide accurate rotational motion data 204 relative to the head of the user U, thereby enabling the wearable audio device 1 to provide accurate spatialized audio. As shown in FIG. 1, $Q_{cal}$ represents ground truth calibration data used to map the sensor orientation 202 of the sensor 200 to the head orientation HO of the user U.

In wearable audio devices 1 with a limited range of wearing positions (such as a set of headphones), calibration data to perform this mapping may be pre-programmed into the memory 125 of the wearable audio device 1. However, certain wearable audio devices 1 (such as earbuds) may be worn in a wide range of positions, rendering pre-programming calibration data impractical. Further, other wearable devices 1 may require affirmative steps to be taken by the user to perform the calibration, such as using an external device to photograph the position of the wearable audio device 1. Many users will fail to perform these affirmative steps, resulting in degraded performance of head tracking, and therefore reducing the quality of spatialized audio generated based on the head tracking. This disclosure recognizes that the sensor orientation 202 of the sensor 200 may be calibrated based on rotational motion data 204 corresponding to pitch motions and/or yaw motions. As these pitch motions and/or yaw motions are natural head motions, the calibration of the sensor orientation 202 of the sensor 200 may occur in the background during normal use, without user intervention. Further, by running in the background, the systems and methods described in this disclosure may automatically calibrate the sensor orientation 202 for wearable audio devices 1 which may be worn in various positions, either intentionally or due to sliding during use.

Figure 2:
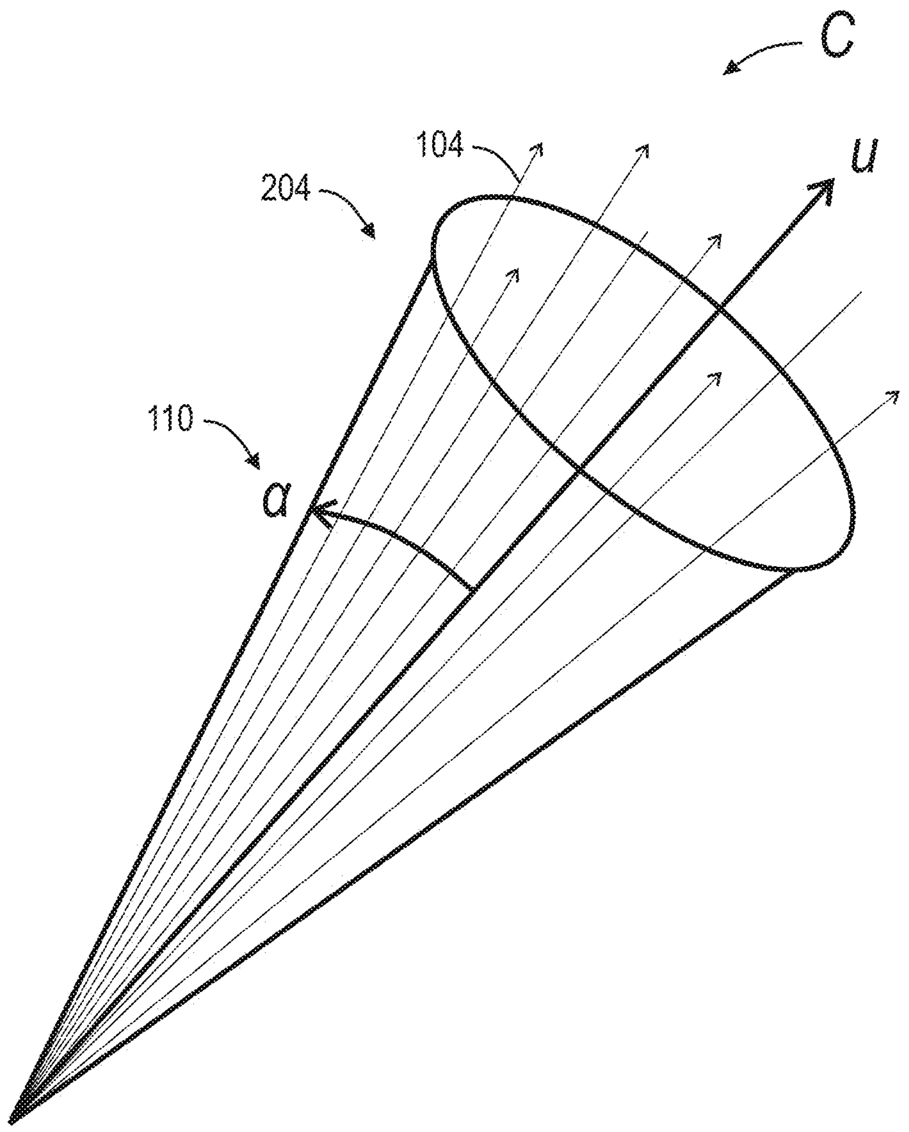
FIG. 2 is an illustration of components of rotational motion data captured by a sensor, in accordance with an example.

FIG. 2 is an illustration of components of the rotational motion data 204 captured by the sensor 200. Rotational motion R may be conceptualized as being defined by a rotation axis αx and an angle θ. Head movement of the user U may be defined by a time series of step rotations dR(t), with each step having its own rotation axis αx. In this example, from time t to time t+1, the head of the user rotates about a first rotation axis $\alpha x_1$. From time t+1 to time t+2, the head of the user rotates about a second rotation axis $\alpha x_2$, and so on. Yaw motions and pitch motions tend to be "tight" rotations. A movement may be considered to be a tight rotation if the rotation axes αx(t) steps comprising the movement cluster tightly around a single axis. Accordingly, in one non-limiting example, a yaw motion or a pitch motion may be identified based on the clustering of the time series of rotation axes αx(t). However, in other examples, yaw motions or pitch motions may be identified through other means, such as a neural network analysis of the rotational motion data 204 and/or other types of data.

In the example of the sensor 200 being embodied as an IMU, the IMU may be configured to capture rotational motion data 204. The rotational motion data 204 may include angular velocity 206 captured by a gyroscope of the IMU. The time series of the angular velocity measurements may be represented by Ω(t), wherein $$\Omega(t) = \frac{dR}{dt}(t) \cdot R^T(t).$$

Accordingly, FIG. 2 illustrates a series of rotation axes 104 derived from the rotational motion data 204. The dispersion of the rotation axes 104 is depicted as an enclosing cone $C\{u_c, \alpha_c)$ parameterized as vector $u_c$ and angle $\alpha_c$. The angle $\alpha_c$ represents a rotational dispersion 110 of the head movement and may be evaluated to be determine if the head movement is "tight" or not. A small angle de, such as ten degrees or less, may correspond to a "tight" motion. If the head movement is "tight," the head movement may be a yaw motion or a pitch motion, and may therefore be used to calibrate the sensor orientation 202 of the sensor 200. Implementation of this concept is illustrated in FIGS. 3-5.

Figure 3:
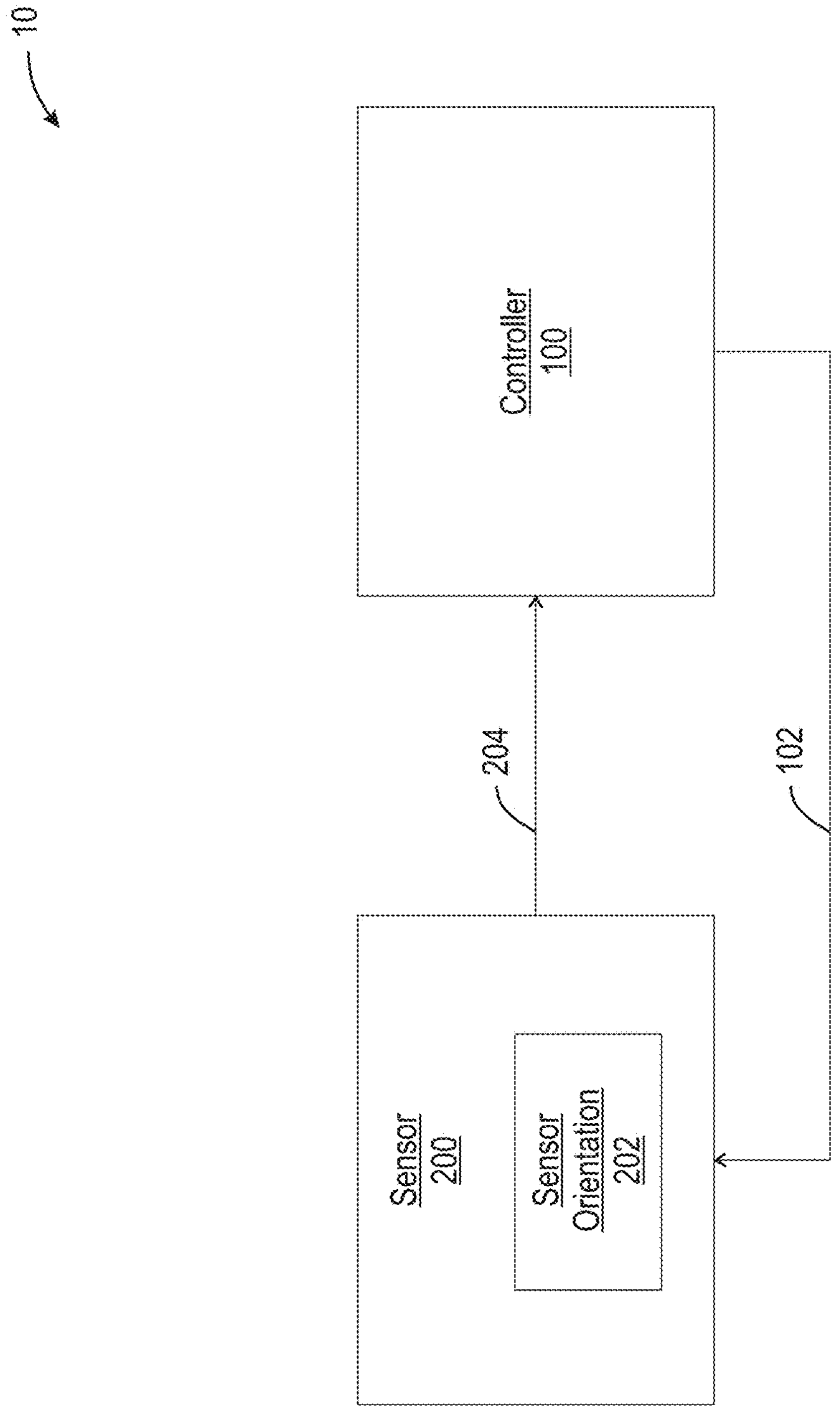
FIG. 3 is a functional block diagram of a system for calibrating a sensor orientation of a sensor, in accordance with an example.

FIG. 3 is a non-limiting example of a generalized functional block diagram of a system 10 for calibrating the sensor orientation 202 of a sensor 200. The system 10 may be embedded within the wearable audio device 1. As shown in FIG. 3, the system 10 broadly includes the sensor 200 and the controller 100. The sensor 200 is defined by the sensor orientation 202, as illustrated in FIG. 1. The sensor 200 captures the rotational motion data 204 while the wearable audio device 1 is worn by the user U. The rotational motion data 204 may include angular velocity data 206. The sensor 200 uses the rotational motion data 204 to update the sensor orientation 202. The sensor 200 then provides the rotational motion data 204 to the controller 100. As will be shown in greater detail in FIGS. 4 and 5, the controller 100 processes the rotational motion data 204 to generate an orientation calibration parameter 102. The controller 100 then provides the orientation calibration parameter 102 to the sensor 200 to calibrate the sensor orientation 202. In some examples, the sensor 200 may continuously stream the rotational motion data 204 to the controller 100 as a background operation while the wearable audio device 1 is in use. In other examples, the sensor 200 may capture and provide the rotational motion data 204 during defined time periods. In further examples, the sensor 200 may also provide the sensor orientation 202 to the controller 100. The controller 100 may then calibrate the sensor orientation 202 by applying the orientation calibration parameter 102. The controller 100 may then provide the calibrated sensor orientation 202 to the sensor 200.

Figure 4:
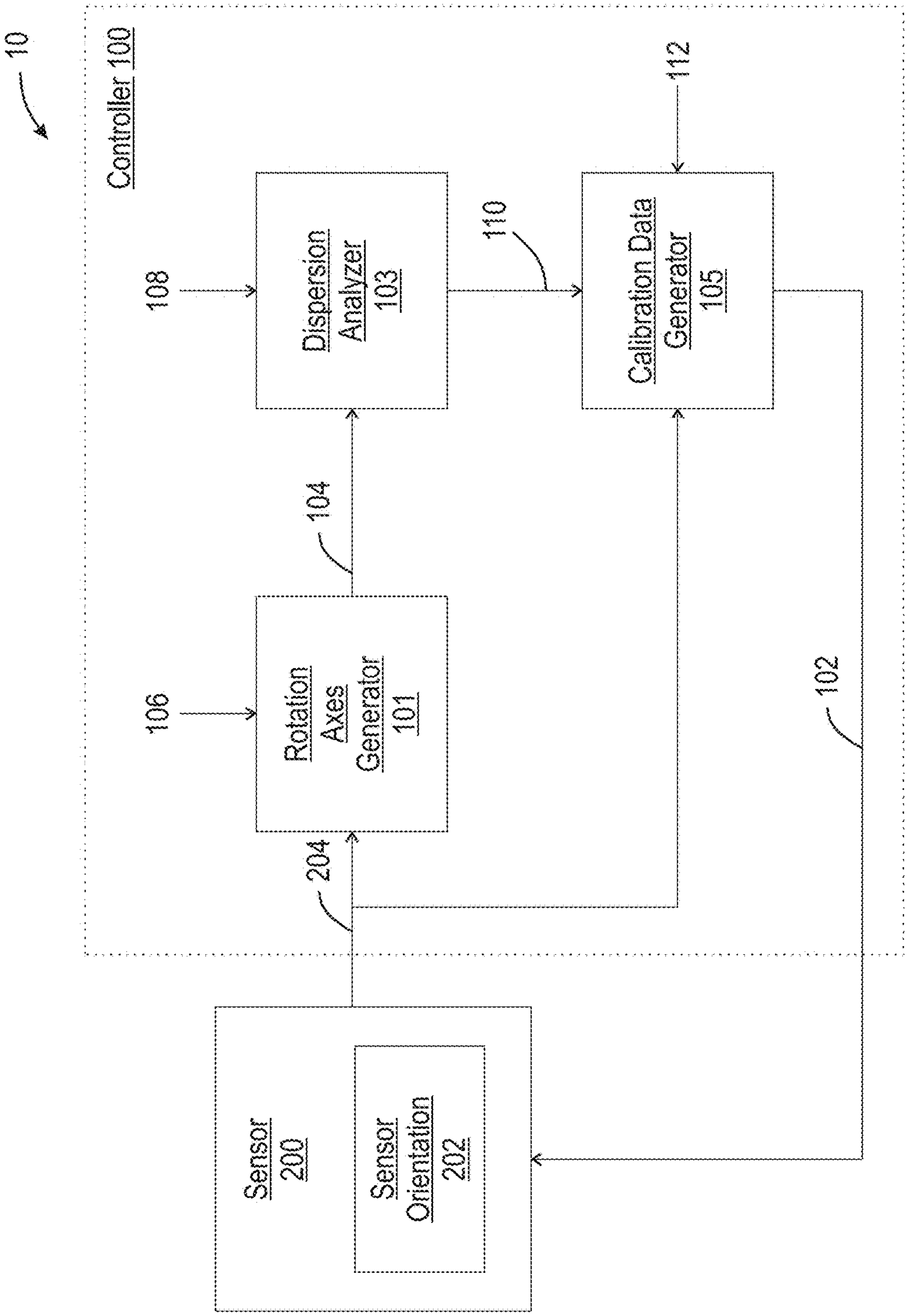
FIG. 4 is a further functional block diagram of the system of FIG. 3, in accordance with an example.
Figure 5:
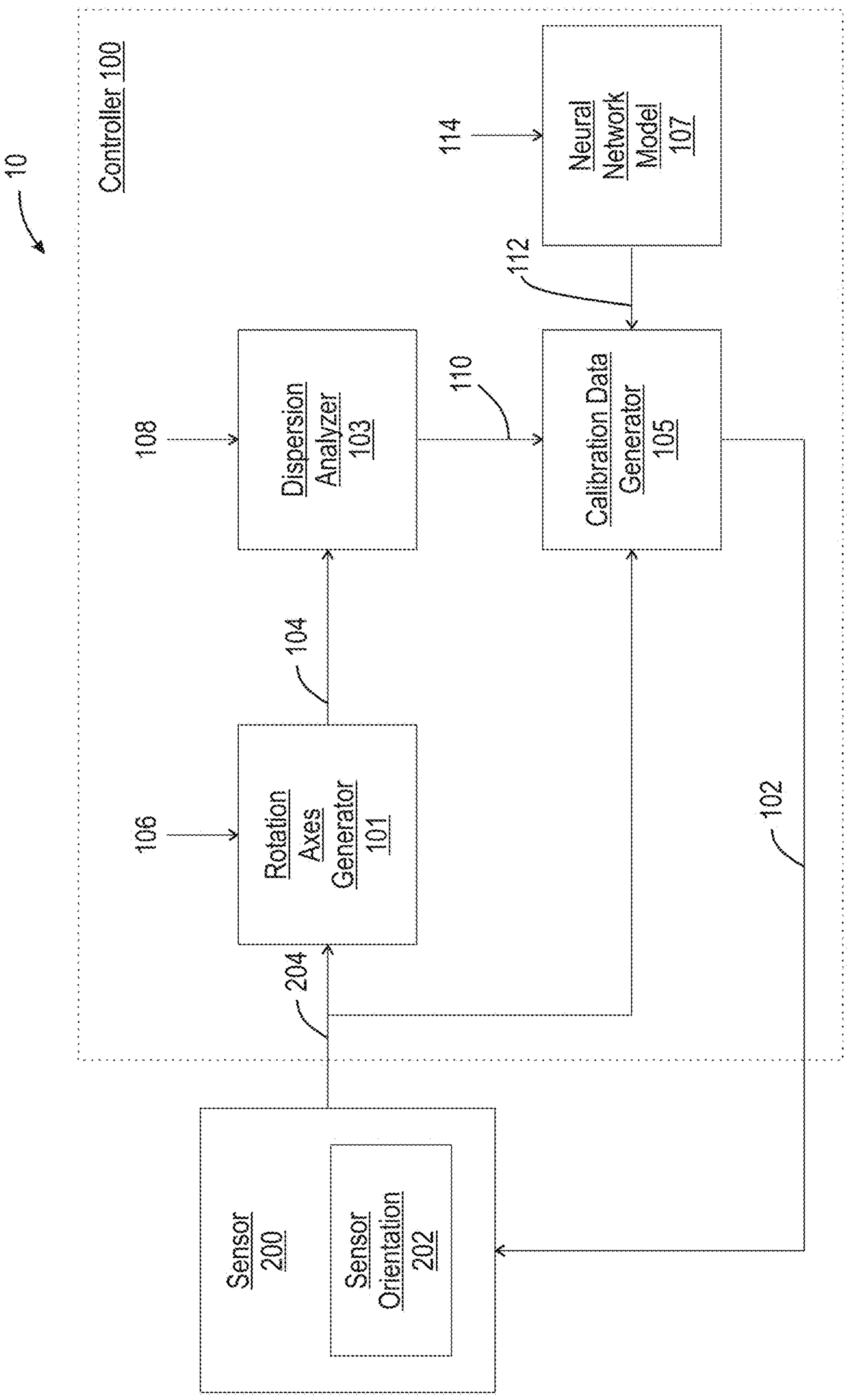
FIG. 5 is a functional block diagram of a variation of the system of FIG. 4, in accordance with an example.

FIG. 4 illustrates a non-limiting variation of the system 10 of FIG. 3 in more detail. In particular, FIG. 4 shows the controller 100 as defined by several subcomponents, including a rotation axes generator 101, a dispersion analyzer 103, and a calibration data generator 105. These subcomponents may be implemented in any practical manner and through any combination hardware and/or software. The rotation axis generator 101 receives the rotational motion data 204 generated by the sensor 200. The rotation axes generator 101 then translates the rotation motion data 204 into a series of rotation axes 104 as illustrated in FIG. 2. Each rotation axis 104 represents rotational movement during one of a series of event periods 106. With reference to the description of FIG. 2, a first event period 106 may be from time t to time t+1, while a second event period 106 may be from time t+1 to time t+2, and so on. The length of time of the event periods 106 may be pre-programmed into the controller 100.

The rotation axis generator 101 provides the series of rotation axes 104 to the dispersion analyzer 103. The dispersion analyzer 103 generates a value for the rotational dispersion 110 of the series of rotation axes 104 over a movement period 108. The length of time of the movement period 108 may be pre-programmed into the controller 100. In some examples, the movement period 108 may be one second, five seconds, or ten seconds. An example of the rotational dispersion 110 is shown in FIG. 2 as angle $\alpha_c$.

The dispersion analyzer 103 provides the rotational dispersion 110 to the calibration data generator 105. The calibration data generator 105 compares the rotational dispersion 110 to a dispersion threshold 112 to determine if the rotational motion data 204 corresponds to "tight" head movement, such as yaw motion or pitch motion. The dispersion threshold 112 may be pre-programmed into the controller 100. In some examples, the dispersion threshold 112 may be less than or equal to 10 degrees. If the rotational dispersion 110 is within the dispersion threshold 112, the calibration data generator 105 generates the orientation calibration parameter 102 based on the rotational motion data 204 captured during the movement period 108. The orientation calibration parameter 102 is then provided to the sensor 200 to calibrate the sensor orientation 202.

In some examples, the orientation calibration parameter 102 may be used for other applications apart from calibrating the sensor 200. For example, analysis of the orientation calibration parameter 102 may provide an indication that the wearable audio 1 is loose, has fallen out of the ear of the user U, or has been intentionally removed.

In some examples, the processes shown in FIG. 4 was run a number of times over a calibration period 116 to provide sufficient estimated head orientation data 102 to accurately calibrate the sensor orientation 202 of the sensor 200. In this example, the calibration period 116 encompasses a number of movement periods 108. Thus, the rotational motion data 204 captured during the calibration period 116 may include several yaw motions and several pitch motions, each of which may be used to calibrate the sensor orientation 202 of the sensor 200. Preferably, the calibration period 116 may be less than one minute. In other, more challenging examples, the calibration period 116 may be as long as 5 minutes.

In some examples, before applying the orientation calibration parameter 102 to the sensor orientation 202, the controller 100 may perform an additional check to ensure that the orientation calibration parameter 102 will properly calibrate the sensor orientation 202. In one such example, the wearable audio device 1 may be a left earbud. In this example, the user U also wears a right earbud. The sensor 200 of the left earbud generates a left gyroscope signal, which is then adjusted by the orientation calibration parameter 102 to correspond to the head orientation HO of the user U. Similarly, the right earbud also includes a sensor to generate a right gyroscope signal, as well as a controller configured to generate a right orientation calibration parameter based on rotational motion data captured by the sensor. The right gyroscope signal is then adjusted by the right orientation calibration parameter. If the left and right orientation calibration parameters are accurate, the left and right calibrated gyroscope signals will overlap. Accordingly, the accuracy of the left and right orientation calibration parameters may be assessed by monitoring if the left and right calibrated gyroscope signals are converging towards each other. If the left and right calibrated gyroscope signals are instead diverging, the left and/or the right orientation calibration parameters may be discarded instead of applied to the sensor orientation of the corresponding sensor.

FIG. 5 illustrates a further, non-limiting, variation of the system 10 of FIG. 4. In the non-limiting example of FIG. 5, the dispersion threshold 112 is provided to the calibration data generator 105 via a neural network model 107. Rather than setting an absolute value for the dispersion threshold 112 (such as 10 degrees), the dispersion threshold 112 may be provided by the neural network model 107. The neural network model 107 may be trained on historical rotation data 114 which correlates rotational dispersion values with yaw motion and/or pitch motion.

Figure 6:
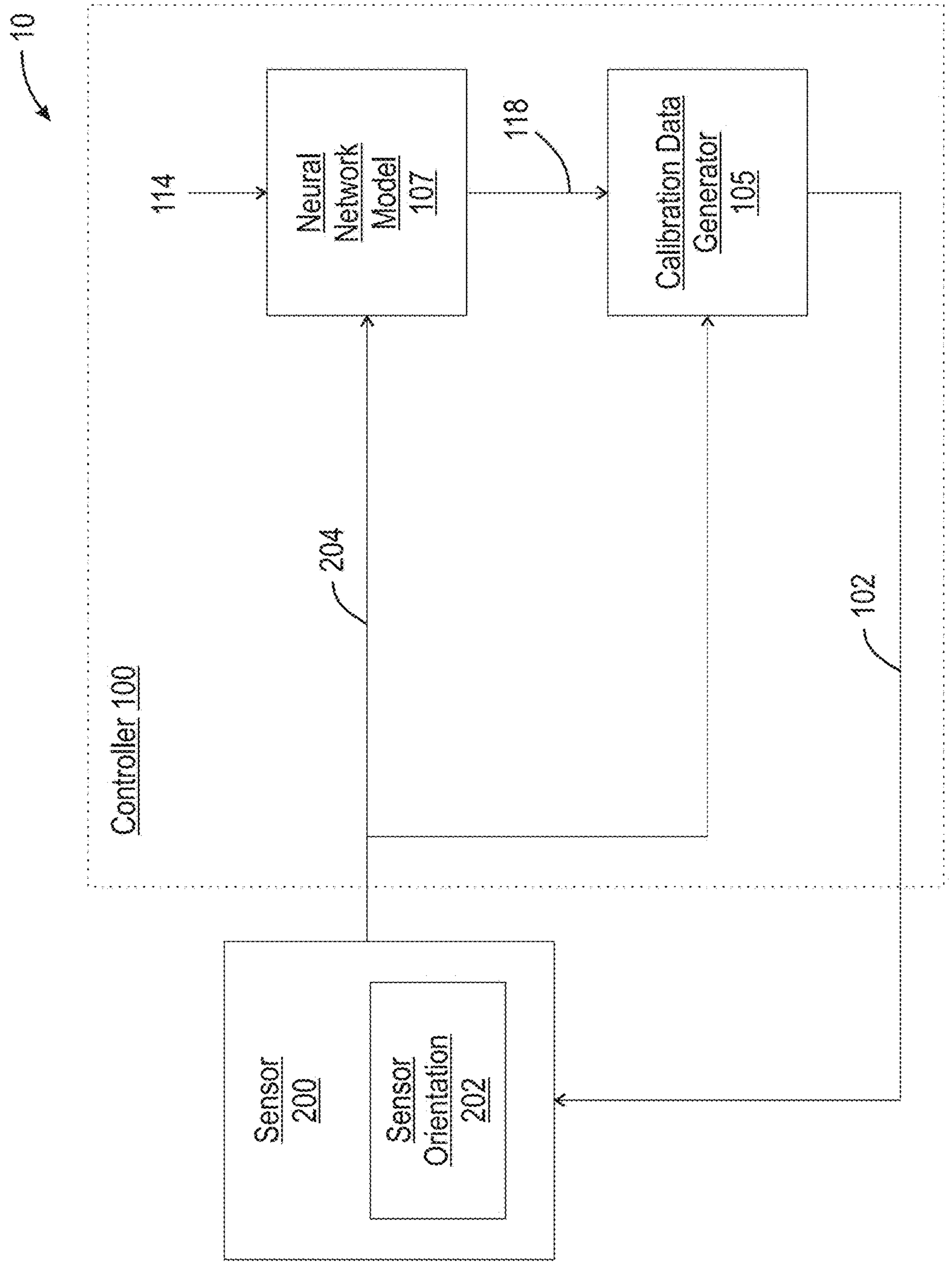
FIG. 6 is a functional block diagram of a variation of the systems of FIGS. 4 and 5, in accordance with an example.

FIG. 6 illustrates a further, non-limiting, variation of the system 10 of FIGS. 4 and 5. In the non-limiting example of FIG. 6, the neural network model 107 may be a more sophisticated model trained to identify "tight" head movements (such as yaw motions and/or pitch motions) directly from the rotational motion data 204, without determining the rotational dispersion 110 of a series rotation axes 104. As shown in FIG. 6, the neural network model 107 may provide the calibration data generator 105 with an indication 118 that rotational motion data 204 corresponds to "tight" head movement. The calibration data generator 105 may then use the rotational motion data 204 corresponding to the "tight" head movement to generate the orientation calibration parameter 102. Accordingly, the neural network model 107 may identify "tight" head movements based on a wide array of different factors beyond rotation axes 104 and rotational dispersion 110.

In further examples, the neural network model 107 may be trained to directly generate the orientation calibration parameter 102 by processing the rotational motion data 204. In this example, the neural network model 107 may be trained on historical rotational motion data and historical orientation calibration parameters to implement a regression analysis to generate orientation calibration parameters 102 from rotational motion data 204.

Figure 7:
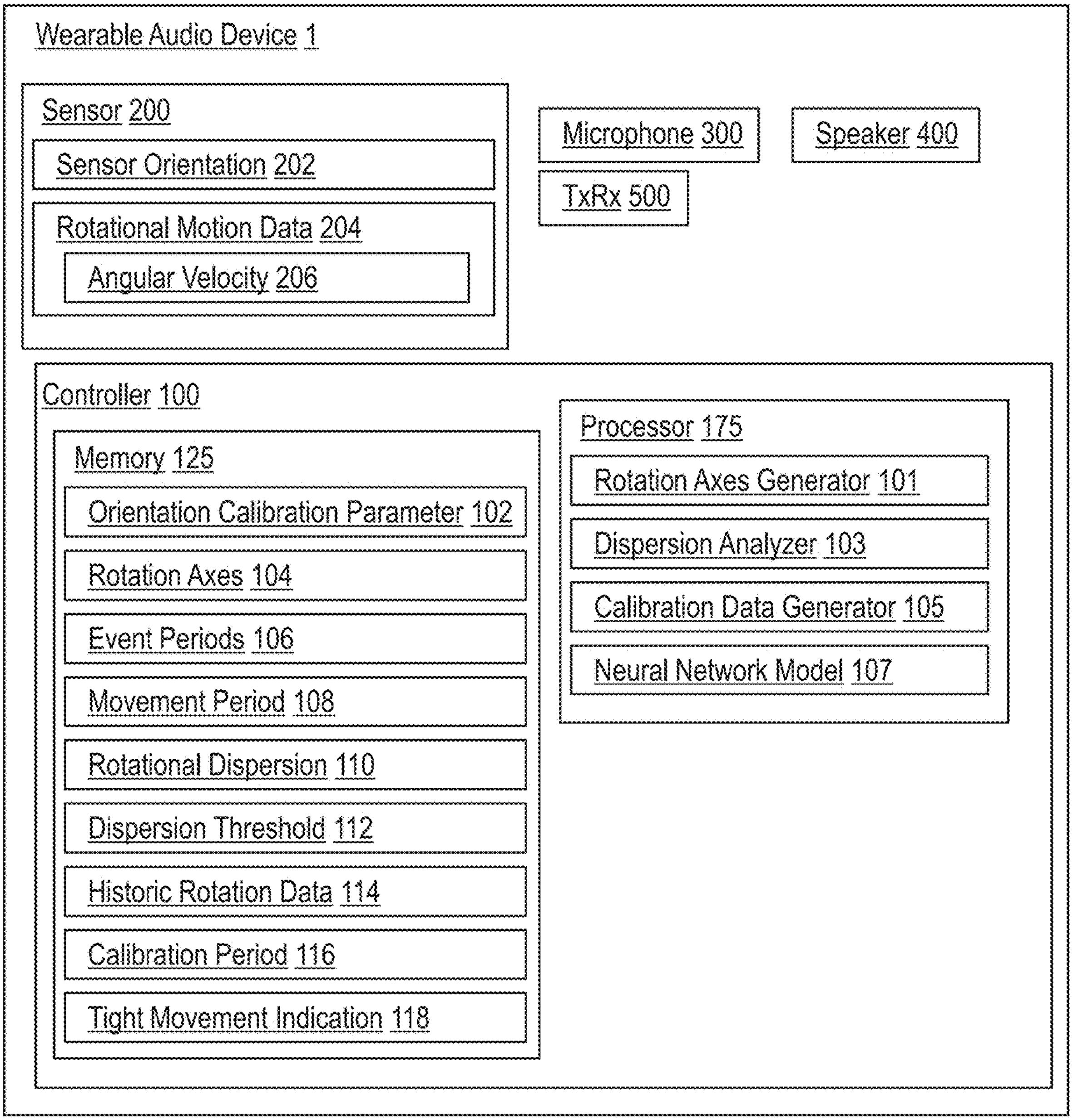
FIG. 7 is a schematic diagram of a wearable audio device, in accordance with an example.

FIG. 7 is a schematic diagram of the wearable audio device 1. Broadly, the wearable audio device 1 includes the controller 100, the sensor 200, the microphone 300, the speaker 400, and the transceiver 500. The controller 100 includes the memory 125 and the processor 175. The memory 125 may store a wide variety of data received by or generated by the controller 100, including the orientation calibration parameter 102, the series of rotation axes 104, the series of event periods 106, the movement period 108, the rotational dispersion 110, the dispersion threshold 112, the historic rotation data 114, the calibration period 116, and the tight movement indications 118. The processor 175 processes the aforementioned data using the rotation axes generator 101, the dispersion analyzer 103, the calibration data generator 105, and the neural network model 107. The sensor 200 is defined by the sensor orientation 202, and is configured to capture rotational motion data 204, such as angular velocity 206. The microphone 300 is configured to capture audio proximate to the wearable audio device 1, such as user speech. The speaker 400 is configured to render audio to the user. The transceiver 500 is configured to enable wireless communication between the wearable audio device 1 and other wireless devices. For example, the transceiver 500 may be used to facilitate wireless communication between the wearable audio device 1 (such as a left earbud) and another wearable audio device (such as a right earbud) or a peripheral device (such as a smartphone, laptop computer, desktop computer, tablet computer, etc.).

Figure 8:
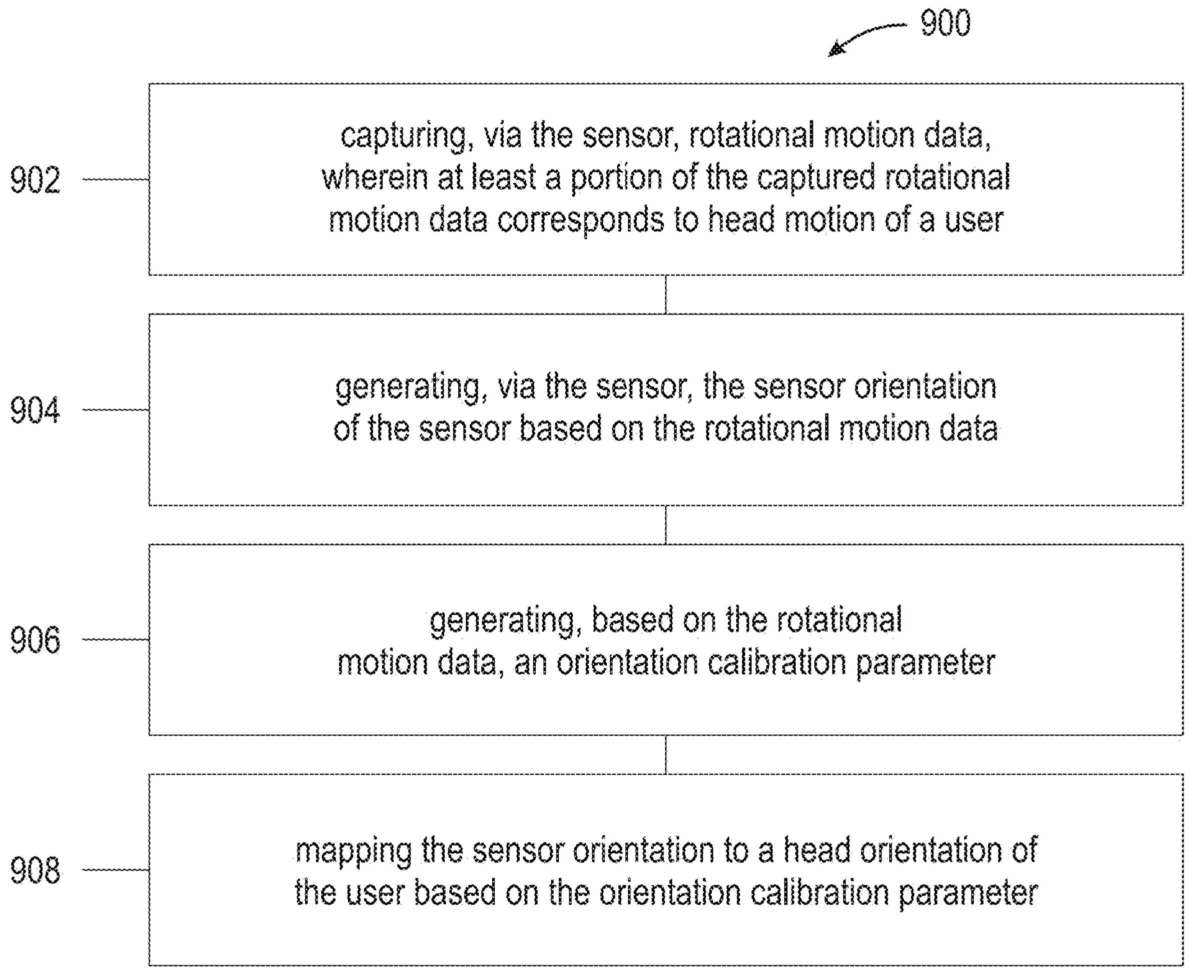
FIG. 8 is a flow chart of a method for automatically calibrating a sensor orientation of a sensor of a wearable audio device, in accordance with an example.
Figure 9:
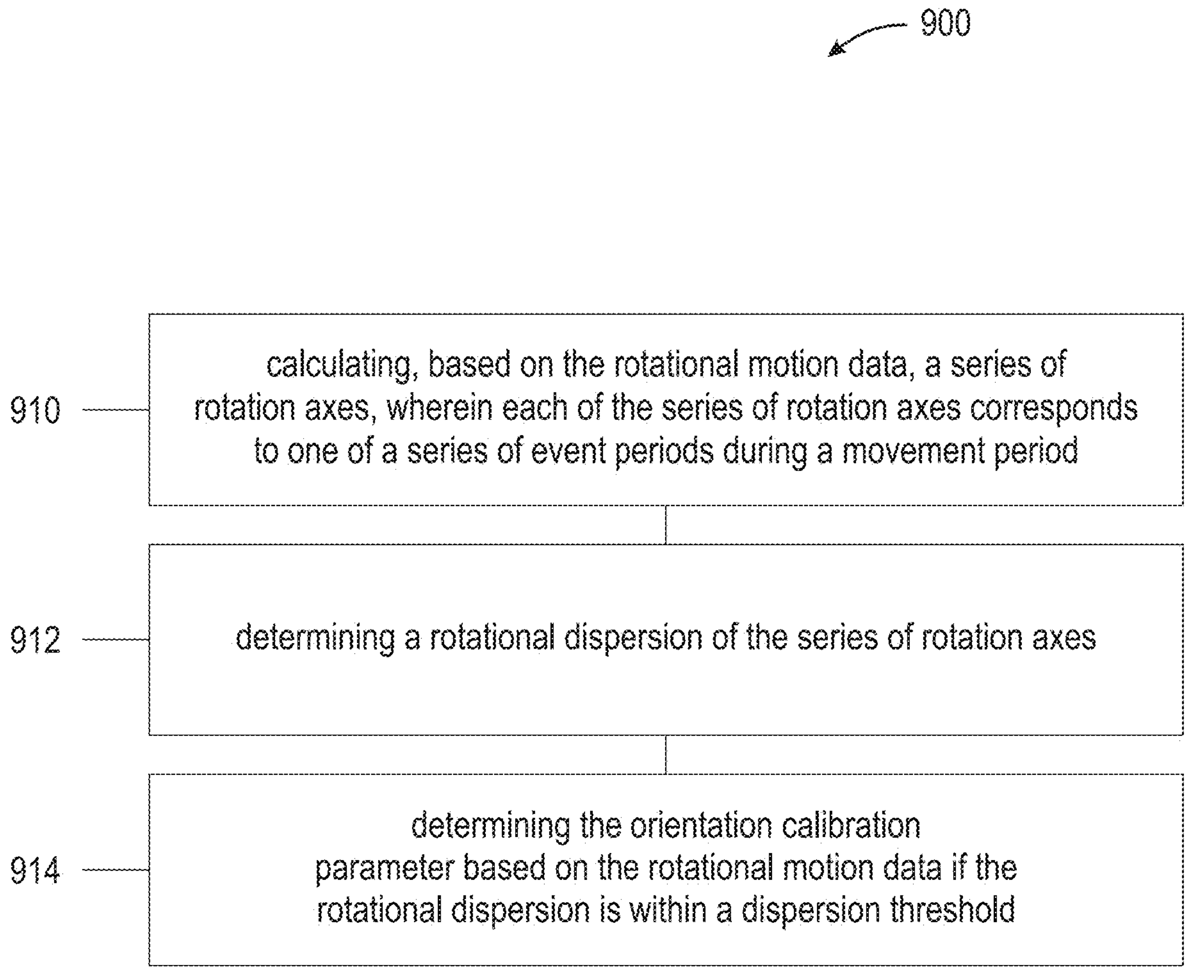
FIG. 9 is a flow chart of further steps of a method for automatically calibrating a sensor orientation of a sensor of a wearable audio device, in accordance with an example.

FIG. 8 is a flow chart of a method 900 for automatically calibrating the sensor orientation 202 of the sensor 200 of the wearable audio device 1, while FIG. 9 is a flow chart of additional steps for automatically calibrating the sensor orientation 202. Referring to FIGS. 1-9, the method 900 includes, in step 902, capturing, via the sensor 200, rotational motion data 204, wherein at least a portion of the captured rotational motion data 204 corresponds to head motion of a user U.

The method 900 further includes, in step 904, generating, via the sensor 200, the sensor orientation 202 of the sensor 200 based on the rotational motion data 204.

The method 900 further includes, in step 906, generating, based on the rotational motion data 204, an orientation calibration parameter 102.

The method 900 further includes, in step 908, mapping the sensor orientation 202 to a head orientation of the user U based on the orientation calibration parameter 102.

As shown in FIG. 9, the method 900 further includes, in step 910, calculating, based on the rotational motion data 204, a series of rotation axes 104, wherein each of the series of rotation axes 104 corresponds to one of a series of event periods 106 during a movement period 108.

The method 900 further includes, in step 912, determining a rotational dispersion 110 of the series of rotational axes 104.

The method 900 further includes, in step 914, determining the orientation calibration parameter 102 based on the rotational motion data 204 if the rotational dispersion 110 is within a dispersion threshold 112.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

What is claimed is:

1. A wearable audio device, comprising:

a sensor configured to:

capture rotational motion data, wherein at least a portion of the captured rotational motion data corresponds to head motion of a user; and generate a sensor orientation of the sensor based on the rotational motion data; and a controller configured to:

receive the rotational motion data and the sensor orientation from the sensor;

generate, based on the rotational motion data, an orientation calibration parameter; and map the sensor orientation to a head orientation of the user based on the orientation calibration parameter, wherein the controller is further configured to:

calculate, based on the rotational motion data, a series of rotation axes, wherein each of the series of rotation axes corresponds to one of a series of event periods during a movement period;

determine a rotational dispersion of the series of rotation axes; and determine the orientation calibration parameter based on the rotational motion data if the rotational dispersion is within a dispersion threshold.

2. The wearable audio device of claim 1, wherein the sensor is an inertial measurement unit (IMU).

3. The wearable audio device of claim 1, wherein the rotational motion data comprises angular velocity.

4. The wearable audio device of claim 1, wherein the head motion comprises a yaw motion.

5. The wearable audio device of claim 1, wherein the head motion comprises a pitch rotation.

6. The wearable audio device of claim 1, wherein the dispersion threshold is less than or equal to 10 degrees.

7. The wearable audio device of claim 1, wherein the dispersion threshold is determined by a neural network model trained by historic rotation data.

8. The wearable audio device of claim 1, wherein the movement period is less than one minute.

9. The wearable audio device of claim 1, wherein the sensor orientation is defined by a sensor x-axis, a sensor y-axis, and a sensor z-axis.

10. The wearable audio device of claim 1, wherein the wearable audio device is an earbud.

11. A method for automatically calibrating a sensor orientation of a sensor of a wearable audio device, comprising:

capturing, via the sensor, rotational motion data, wherein at least a portion of the captured rotational motion data corresponds to head motion of a user;

generating, via the sensor, the sensor orientation of the sensor based on the rotational motion data;

generating, based on the rotational motion data, an orientation calibration parameter; and mapping the sensor orientation to a head orientation of the user based on the orientation calibration parameter, wherein calibrating the sensor orientation of the sensor further comprises:

calculating, based on the rotational motion data, a series of rotation axes, wherein each of the series of rotation axes corresponds to one of a series of event periods during a movement period;

determining a rotational dispersion of the series of rotation axes; and determining the orientation calibration parameter based on the rotational motion data if the rotational dispersion is within a dispersion threshold.

12. The method of claim 11, wherein the sensor is an inertial measurement unit (IMU).

13. The method of claim 11, wherein the rotational motion data comprises angular velocity.

14. The method of claim 11, wherein the head motion comprises a yaw motion.

15. The method of claim 11, wherein the head motion comprises a pitch motion.

16. The method of claim 12, wherein the dispersion threshold is less than or equal to 10 degrees.

17. The method of claim 12, wherein the dispersion threshold is determined by a neural network model trained by historic rotation data.

18. The method of claim 11, wherein the sensor orientation is defined by a sensor x-axis, a sensor y-axis, and a sensor z-axis.

* * * * *